(12) United States Patent
Dudar (10) Patent No.: US 10,489,994 B2
(45) Date of Patent: Nov. 26, 2019

(54) VEHICLE SOUND ACTIVATION (71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 127 days.

(21) Appl. No.: 15/352,756

(22) Filed: Nov. 16, 2016

(65) Prior Publication Data

US 2018/0137697 A1    May 17, 2018

(51) Int. Cl.
| | | |
|---|---|---|
| *G07C 5/08* | (2006.01) | |
| *B60Q 5/00* | (2006.01) | |
| *G07C 5/00* | (2006.01) | |
| *B60Q 11/00* | (2006.01) | |

(52) U.S. Cl.
CPC ............ *G07C 5/0808* (2013.01); *B60Q 5/008* (2013.01); *B60Q 11/00* (2013.01); *G07C 5/008* (2013.01)

(58) Field of Classification Search
None
See application file for complete search history.

(56) References Cited

U.S. PATENT DOCUMENTS

| | | |
|---|---|---|
| 2009/0066499 A1 | 3/2009 | Bai et al. |
| 2012/0179280 A1 | 7/2012 | Faye |
| 2013/0070933 A1* | 3/2013 | Itou .................. H04R 3/007 381/59 |
| 2015/0139442 A1 | 5/2015 | Kreifeldt et al. |
| 2015/0268665 A1 | 9/2015 | Ludwick et al. |
| 2016/0152183 A1 | 6/2016 | Kim |

FOREIGN PATENT DOCUMENTS

| | | |
|---|---|---|
| DE | 102013107738 A1 | 1/2015 |
| JP | 2012056400 A | 3/2012 |
| KR | 20130055836 A | 5/2013 |
| WO | WO 2013118250 A1 | 8/2013 |
| WO | 2015167192 A1 | 11/2015 |

OTHER PUBLICATIONS

Search Report from United Kingdom Intellectual Property Office dated Apr. 18, 2018 regarding Application No. GB1718783.2 (3 pages).

* cited by examiner

Primary Examiner — John Olszewski
Assistant Examiner — Gerrad A Foster
(74) Attorney, Agent, or Firm — Frank A. MacKenzie; Bejin Bieneman PLC (57) ABSTRACT

A computer is programmed to receive audio data from a first vehicle sensor following an instruction to a second vehicle to actuate sound output. The computer generates diagnostic data about the received audio data. The computer may then actuate output based on the diagnostic data.

17 Claims, 4 Drawing Sheets

VEHICLE SOUND ACTIVATION

BACKGROUND

Engine sound of a vehicle may gain attention of pedestrians and/or drivers of other vehicles. Therefore, the engine sound may reduce a likelihood of a collision. For example, a pedestrian who intends to cross a street may recognize an oncoming vehicle based on hearing a sound of the vehicle engine. However, some vehicles, such a hybrid or electric vehicles, can be operated without an internal combustion engine, thus lacking an engine sound. Synthetic sound systems may be used to compensate for the lack of an engine sound, e.g., a synthetic sound is produced when a hybrid vehicle is moving by using an electric motor of the vehicle. Dangers arise when synthetic sound systems fail to operate and/or do not operate properly.

DETAILED DESCRIPTION

Introduction

Figure 1:
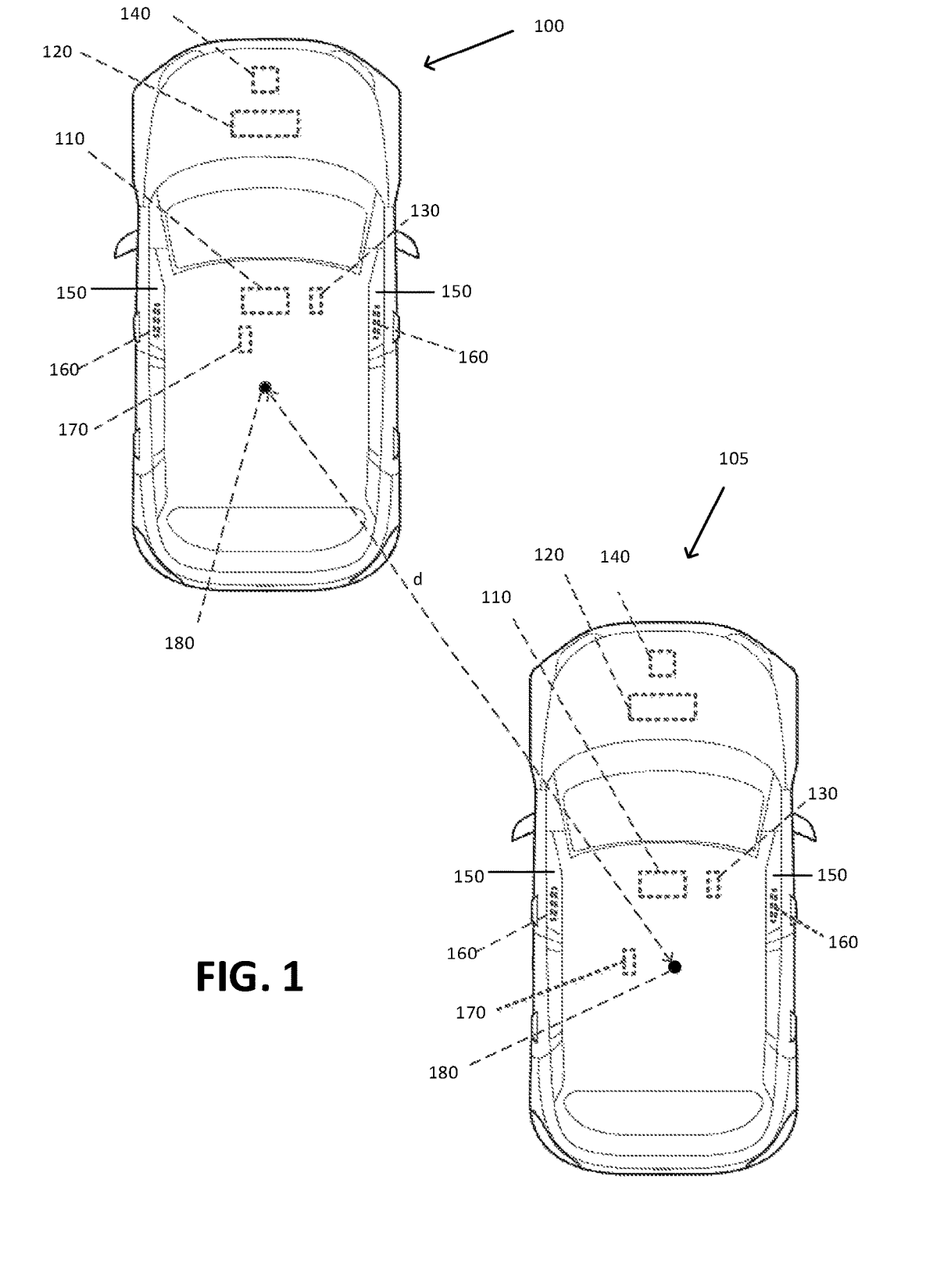
FIG. 1 is a diagram showing vehicles with respective sound generation systems.

Referring to FIG. 1, a first vehicle 100 computer 110 is programmed to receive audio data from a first vehicle 100 sensor 130 following an instruction to a second vehicle 105 to actuate sound output, e.g., a sound generation system 140. The computer 110 generates diagnostic data about the received audio data. The computer 110 may then cause an action based on the diagnostic data, e.g., sending a message to the second vehicle 105 including data associated with a detected fault.

FIG. 1 is a block diagram of vehicles 100, 105. For convenience and not to indicate any order or precedence, the vehicles 100, 105 may be referred to as a first vehicle 100 and a second vehicle 105. As seen in FIG. 1, a first vehicle 100 and a second vehicle 105 may have common elements, including a computer 110, an engine 120, an audio sensor 130, a sound generation system 140, a window 150, and/or a window opener 160, each of which are discussed in more detail below.

System Elements

FIG. 1 illustrates first and second vehicles 100, 105. The vehicles 100, 105 may be powered in a variety of known ways, e.g., with an electric motor and/or internal combustion engine. Each of the vehicles 100, 105 may be a land vehicle such as a car, truck, etc. or an airborne vehicle such as a drone. In one example, the first vehicle 100 and the second vehicle may be a drone and a car respectively. Each of the vehicles 100, 105 may include a computer 100, a sound generation system 140 such as a speaker, an internal combustion (IC) engine 120, an audio sensor 130, a window 150, a window opener 160, and other components described herein below. Each of the vehicles 100, 105 has a geometrical center point 180, e.g., points at which respective longitudinal and lateral center lines of the vehicles 100, 105 intersect.

The computer 110 includes a processor and a memory such as are known. The memory includes one or more forms of computer-readable media, and stores instructions executable by the computer 110 for performing various operations, including as disclosed herein.

The computer 110 may operate the respective vehicle 100, 105 in an autonomous or semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally or alternatively, the computer 110 may include programming to operate one or more of airborne vehicle operations including take off, landing, flying, etc. Additionally, the computer 110 may be programmed to determine whether and when a human operator is to control such operations.

The computer 110 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle network, the computer 110 may transmit messages to various devices in the vehicle and/or receive messages from the various devices, e.g., an audio sensor 130, a sound generation system 140, etc. Alternatively or additionally, in cases where the computer 110 actually comprises multiple devices, the vehicle communication network may be used for communications between devices represented as the computer 110 in this disclosure. Further, as mentioned below, various controllers and/or sensors may provide data to the computer 110 via the vehicle communication network.

Actuators of the vehicles 100, 105 are implemented via circuits, chips, or other electronic, and or mechanical components that can actuate various vehicle subsystems in accordance with appropriate control signals as is known. The actuators may be used to control braking, acceleration, and steering of the vehicles 100, 105. Further, the actuators may include a sound generation system 140, and one or more window opener(s) 160. The computer 110 may actuate the sound generation system 140 to generate a sound, e.g., similar to engine 120 sound at an engine idle speed. For example, the computer 110 may actuate the sound generation system 140 by sending a control instruction including data indicating an amplitude and/or frequency content, i.e., a shape of, sound waves. A sound wave may be decomposed to a sum of multiple sinusoidal waves, such as is known. Each of the sinusoidal waves, herein referred to as a frequency component, may be defined by a frequency. Additionally, a frequency component may include an amplitude of the respective wave. In other words, a sound wave may be a sum of multiple frequency components, each defined by a respective frequency and an amplitude. A sound generation system 140 includes one or more speakers mounted to the vehicle 100, 105, e.g., under a hood, on a bumper, etc. The sound generation system 140 may further include electronic components, e.g., amplifiers, chips, etc., for controlling sound output. The sound generation system 140 may receive analog and/or digital actuating signals from the computer 110.

The computer 110 may actuate a vehicle 100, 105 window opener 160 to open or close a vehicle 100, 105 window 150. A window opener 160 may include an electric motor mechanically coupled to a vehicle 100, 105 window 150. For example, the computer 110 may actuate the window opener 160 electric motor to open or close the window 150.

In addition, the computer 110 may be configured for communicating through a vehicle-to-vehicle (V-to-V) wireless communication interface with other vehicles 100, 105, e.g., via a vehicle-to-vehicle communication network. The V-to-V communication network represents one or more mechanisms by which the computers 110 of vehicles 100, 105 may communicate with other vehicles 100, 105, and may be one or more of wireless communication mechanisms, including any desired combination of wireless (e.g., cellular, wireless, satellite, microwave and radio frequency) communication mechanisms and any desired network topology (or topologies when multiple communication mechanisms are utilized), Exemplary V-to-V communication networks include cellular, BLUETOOTH™, IEEE 802.11, dedicated short range communications (DSRC), and/or wide area networks (WAN), including the Internet, providing data communication services. For example, the computer 110 of a first vehicle 100 can be programmed to send a control instruction, via a V-to-V wireless communication interface, to a second vehicle 105 to actuate a second vehicle 105 sound generation system 140.

The computer 110 may receive audio data from audio sensor 130, e.g., a microphone, included in the vehicle 100, 105, e.g., an audio sensor 130 included in a vehicle 100, 105 human machine interface. The received audio data may indicate an amplitude and/or shape, ie. frequency content, of received acoustic sound waves, Additionally or alternatively, the computer 110 may receive audio data from a mobile device 170, e.g., of an occupant of the vehicle 100,105. For example, the computer 110 may communicate via a wireless network such as BLUETOOTH ™with the mobile device 170. Thus, the computer 110 may receive the audio data via the wireless network.

Processes

Figure 2:
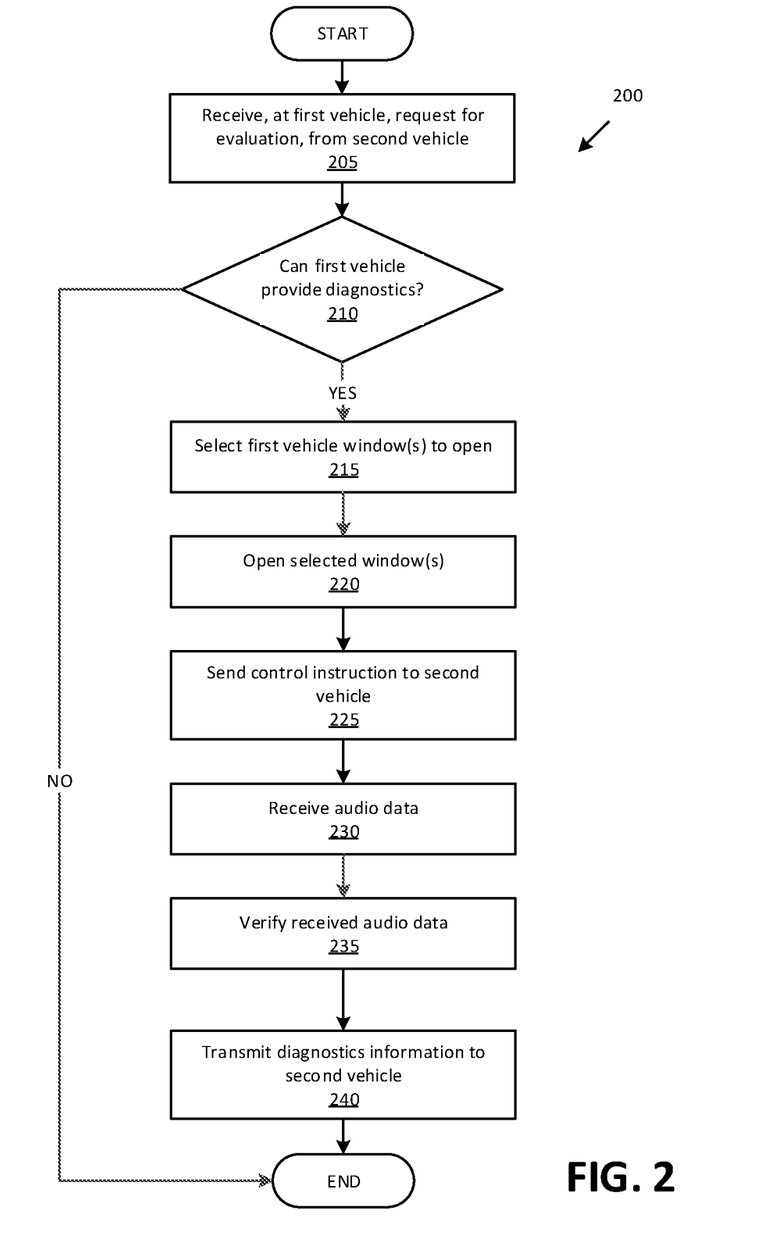
FIG. 2 is a flowchart of an exemplary process for a first vehicle to determine whether there is a fault in a second vehicle sound generation system.

FIG. 2 illustrates an exemplary process 200 for a first vehicle 100 for evaluating an operation of a second vehicle 105 sound generation system 140. For example, the first vehicle 100 computer 110 may be programmed to execute the process 200.

The process 200 begins in a block 205, in which a first vehicle 100 computer 110 receives, via a first vehicle 100 V-to-V communication interface, a request for evaluation from a second vehicle 105, e.g., a request for evaluating whether there is a fault in the second vehicle 105 sound generation system 140, e.g., the sound generation system is not producing sounds despite a an actuation instruction from the computer 110 to do so, or sound is being generated at a volume and/or tone, etc., that does not meet predetermined values for adequate sound. Additionally or alternatively, the computer 110 may receive a request to evaluate a tone, i.e., frequency, and amplitude of a sound generated by the second vehicle 105 sound generation system 140, and to provide data concerning such values in response to the request, even if a fault is not determined or detected. The received request for evaluation may include various data such as a location, e.g., GPS location coordinates, of the second vehicle 105, and attribute data of the second vehicle 105 sound generation system 140, etc. For example, the attribute data may indicate a range of frequency components that can be generated by the sound generation system 140. For example, the data may indicate that frequencies 80-120 Hz with an amplitude 80-120 decibels can be generated by the sound generation system 140. As another example, the attribute data may include a specific set of frequency components, e.g., a first frequency component of 90 Hz and 80 decibels and a second frequency component of 100 Hz and 90 decibels. As another example, the attribute data may include a recorded sound wave, e.g., a digitally recorded sound such as is known.

Next, in a decision block 210, the first vehicle 100 computer 110 determines whether the first vehicle 100 can provide diagnostics to the second vehicle 105. For example, the first vehicle 100 computer 110 may determine whether the first vehicle 100 computer 110 can actuate the second vehicle 105 sound generation system 140, receive audio data, and verify whether the second vehicle 105 sound generation system has a fault. Additionally, the first vehicle 100 computer 110 may determine a distance d between predetermined points, e.g., center points 180, of the first and second vehicles 100, 105 and determine, based on the determined distance d, whether the diagnostics can be provided. The sound waves generated by the second vehicle 105 sound generation system 140 attenuate with increasing distance d between the vehicles 100, 105. Thus, in one example, the first vehicle 100 computer 110 may determine that diagnostics can be provided when the determined distance d between the vehicles 100, 105 is less than a predetermined threshold. In another example, the first vehicle 100 computer 110 may receive data indicating a speed of the second vehicle 105, e.g., via V-to-V communication interface or a first vehicle 100 sensor such as an object detection sensor. The first vehicle 100 computer 110 may determine whether the first vehicle 100 computer 110 can provide diagnostics based on the speed of the second vehicle 105. A speed of the vehicles 100, 105 relative to one another may affect an accuracy of evaluation, e.g., due to Doppler effect. Thus, in one example, the computer 110 may be programmed to determine that diagnostics can be provided when a speed of the second vehicle 105 relative to a speed of the first vehicle 100 is less than a predetermined speed threshold, e.g., 10 km/h. If the first vehicle 100 computer 110 determines that the diagnostics can be provided, then the process 200 proceeds to a block 215; otherwise the process 200 ends, or return to the block 205, although not shown in the process 200.

In the block 215, the first vehicle 100 computer 110 selects one or more windows 150 of the first vehicle 100 to be opened. The first vehicle 100 audio sensor(s) 130 and/or a mobile device 170 may be in the vehicle 100 interior, e.g., in an interior of a sedan vehicle 100. Thus, to capture sound waves from the second vehicle 105, the first vehicle 100 window(s) 150 should be opened to allow sound waves to enter the interior of the first vehicle 100. In one example, the first vehicle 100 computer 110 may select one or more windows 150 based on a location of the second vehicle 105 relative to the first vehicle 100, e.g., by selecting windows 150 on a right side of the first vehicle 100 when the second vehicle 105 is on a right side of the first vehicle 100. As another example, the first vehicle 100 computer 110 may select to open all windows 150.

Next, in a block 220, the first vehicle 100 computer 110 actuates the window opener(s) 160 to open the selected window(s) 150. Additionally, the computer 110 may not actuate window opener(s) 160 when, e.g., it is determined based on data from first vehicle 100 sensors that the selected window(s) 150 are already open, or a roof of a convertible vehicle 100 is open.

Next, in a block 225, the first vehicle 100 computer 110 sends control instructions to the second vehicle 105 to actuate the sound generation system 140 of the second vehicle 105. For example, the control instruction may include data indicating a length of time that the sound generation system 140 should be actuated, e.g., 5 seconds. Additionally or alternatively, the control instructions may include data indicating a multi-step actuation, e.g., a pattern of 3 times actuating the sound generation system 140, each time for duration of 1 second on and 1 second off. Additionally, the control instructions may include data indicating frequency components and amplitude of expected sound. Additionally, the control instructions may include an identifier, e.g., a vehicle identification number (VIN), of the second vehicle 105 to prevent any vehicle other than the second vehicle 105 responding by actuating its sound generation system based on the control instructions from the first vehicle 100 and, thus, causing a false detection.

Next, in a block 230, the first vehicle 100 computer 110 receives audio data from, e.g., the first vehicle 100 audio sensor(s) 130, a mobile device 170 in the first vehicle 100, etc. Additionally, the first vehicle 100 computer 110 may receive status data via the V-to-V communication interface from the second vehicle 105, e.g., data indicating frequency and amplitude of sound being generated by the sound generation system 140 of the second vehicle 105 based on the control instructions send by the first vehicle 100, i.e., synchronized with the operation of the sound generation system 140. The received data may further include a second vehicle 105 identifier, e.g., VIN. For example, the second vehicle 105 may send status data including the second vehicle 105 VIN and an indication whether the sound generation system 140 is active or inactive, depending on a current state of the sound generation system 140. The first vehicle 100 computer 110 can then receive the sound data and the status data. For example, the first vehicle 100 computer 110 may determine whether a received sound is originated from the second vehicle 105 by comparing the status data to the received audio data, i.e., whether a time duration of received audio data corresponds to a time duration of status data indicating active.

Next, in a block 235, the first vehicle 100 computer 110 verifies the received audio data, e.g., to determine whether there is a fault at the sound generation system 140 of the second vehicle 105, to determine whether an amplitude and/or frequency or generated sound meets one or more expected attributes, etc. The computer 110 then generates diagnostic data indicating, e.g., whether a fault was determined in the sound generation system 140. For example, the computer 110 may detect a fault by calculating a frequency distribution of the received audio data and determining, based on the calculated frequency distribution, whether the received data includes one or more predetermined expected frequency components. The predetermined expected frequency components may be defined based on the control instructions sent by the first vehicle 100 computer 110 and/or based on the received data from the second vehicle 105. As another example, the computer 110 receives data from a first vehicle 100 object detection sensor and identifies the predetermined expected frequency components based on the received data, e.g., based on a size of the second vehicle 105. In other words, frequency components and/or amplitude of sound may be determined based on a size, type, etc. of the detected vehicle 105.

The received audio data may include audio data from vehicles other than the second vehicle 105. Thus, the first vehicle 100 computer 110 may be programmed to detect the audio data associated with the second vehicle 105 within the received audio data. For example, the first vehicle 100 computer 110 may be programmed to determine whether an audio data is generated by the second vehicle 105 based on the control instructions from the first vehicle 100 and/or the received status data from the second vehicle. As an example, as described above, the control instructions may include a length of time or multiple steps for actuation of the sound generation system 140. Thus, the first vehicle 100 computer 110 may determine whether the sound is originated from the second vehicle 105 based on length of time, or a pattern of multiple steps as commanded in the control instruction. As another example, as described above, the second vehicle 105 may send data indicating a status data, via a wireless network, that is synchronous to an operation of actuating the sound generation system 140. For example, the first vehicle 100 computer 110 may determine whether a received sound is originated from the second vehicle 105 by comparing the status data to the received audio data, i.e., whether a time duration of received audio data corresponds to a time duration of data indicating activity of the second vehicle 105 sound generation system 140. Additionally, the first vehicle 100 computer 110 may determine whether the received audio data is originated from the second vehicle 105 based on the received status data. For example, whether the frequency, time length, etc. of the received audio data matches the status being indicated in the status data received from the second vehicle 105.

Additionally or alternatively, the first vehicle 100 computer 110 may use various signal processing techniques such as are known for distinguishing a sound from background noise, e.g., to distinguish sound generated by the second vehicle 105 sound generation system from other sounds and noises received in an area around the first vehicle 100. The computer 110 may identify the predetermined amplitude threshold based on the received attribute data from the second vehicle 105. For example, the attribute data include an amplitude of sound that can be generated by the sound generation system 140 of the second vehicle 105. However, an amplitude of sound received by the first vehicle 100 from the second vehicle 105 may further depend on other factors such as a distance d and/or location of the second vehicle 105 relative to the first vehicle 100 and/or a relative speed of vehicles 100, 105. Thus, the computer 110 may determine whether the amplitude of the received audio data exceeds the predetermined amplitude threshold further based on a second vehicle 105 location and/or distance d relative to a first vehicle 100 location. For example, the computer 110 may determine an amplitude threshold of 80 decibels when the attribute data of the second vehicle 105 indicates an amplitude of 100 decibels and a distance d between the vehicles 100, 105 is 25 meters.

Next, in a block 240, the computer 110 transmits the diagnostic data via the V-to-V communication interface of the first vehicle 100, e.g., to the second vehicle 105.

Following the block 240, the process 200 ends, or returns to the block 205, although not shown in the process 200.

Figure 3A:
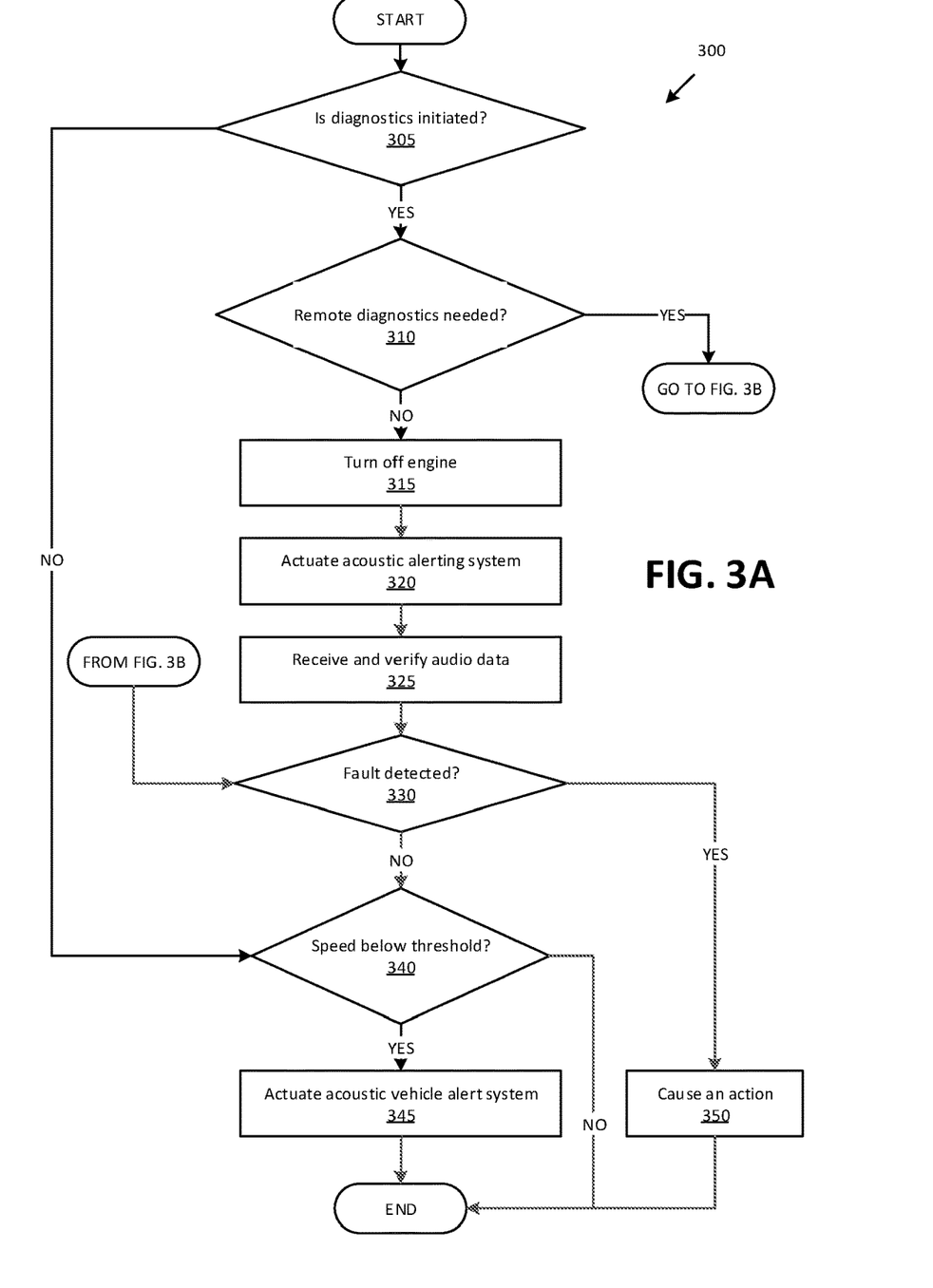
FIGS. 3A-3B are a flowchart of an exemplary process for operating a second vehicle sound generation system.
Figure 3B:
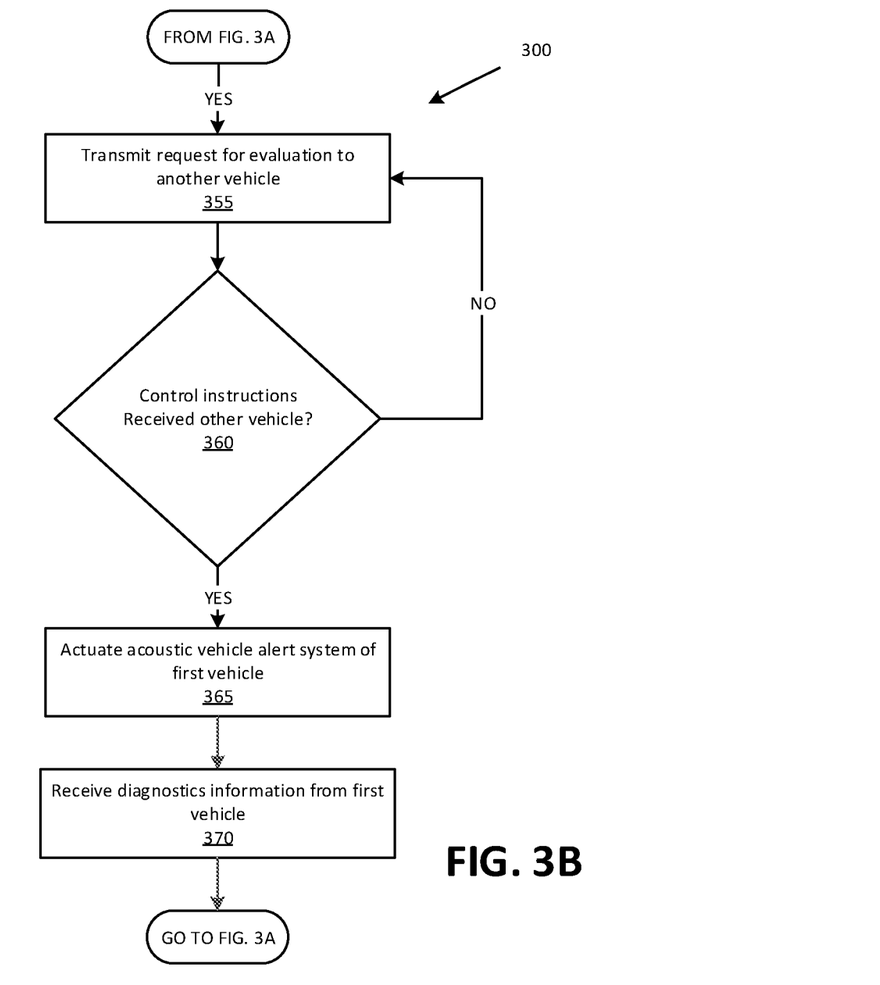

FIGS. 3A-3B illustrate an exemplary process 300 for operating of a second vehicle 105 sound generation system 140. For example, the second vehicle 105 computer 110 can be programmed to execute the process 300.

The process 300 begins in a block 305, in which the second vehicle 105 computer 110 determines whether a diagnostic operation of the second vehicle 105 sound generation system 140 is initiated. An initiation of a diagnostic operation may be based on various conditions, e.g., upon turning on a second vehicle 105 ignition, based on a user input, e.g., via the mobile device 170 or a human machine interface of the computer 110, after travelling more than a predetermined time, etc. If the computer 110 determines that the diagnostics is initiated, the process 300 proceeds to a decision block 310; otherwise the process 300 proceeds to a decision block 340.

In the decision block 310, the second vehicle 105 computer 110 determines whether a remote diagnostic operation, e.g., via a first vehicle 100, is needed. For example, the second vehicle 105 computer 110 may determine that a remote diagnostic operation is needed when the second vehicle 105 lacks an audio sensor 130 to receive audio data from the sound generation system 140 of the second vehicle 105 or a second vehicle 105 audio sensor 130 fails to operate. In another example, the second vehicle 105 computer 110 may determine that a remote diagnostic operation is unnecessary when the computer 110 determines that it can receive audio data via a second vehicle 105 audio sensor 130 and/or a mobile device 170 in the second vehicle 105. If the second vehicle 105 computer 110 determines that a remote diagnostic operation is needed, then the process 300 proceeds to a block 355 (see FIG. 3B); otherwise the process 300 proceeds to a block 315.

In the block 315, the second vehicle 105 computer 110 may cause a second vehicle 105 internal combustion engine 120 to turn off, e.g., by sending a control instruction to a powertrain controller. For example, a hybrid second vehicle 105 may include an engine 120 and an electric motor. The second vehicle 105 computer 110 may be programmed to turn off the vehicle 105 engine 120 to prevent a generation of a sound by the engine 120. In another example, the block 315 may be unnecessary for a second vehicle 105 lacking an engine 120, e.g., an all-electric second vehicle 105.

Next, in a decision block 320, the second vehicle 105 computer 110 actuates a second vehicle 105 sound generation system 140, e.g., generating a sound for a predetermined length of time such as 5 seconds, based on attribute data of the sound generation system 140. Various techniques may be used to identify the attribute data of the sound generation system 140. In one example, the second vehicle 105 may record a sound of the second vehicle 105 engine 120 when the second vehicle 105 is powered by an engine 120 of the vehicle 105. The computer 110 may actuate the sound generation system 140 based on the recorded engine 120 sound, e.g., based on a pre-recorded audio data. Alternatively, the computer 110 may identify frequency components and/or an amplitude of the engine 120 sound based on the recorded audio data and actuate the sound generation system 140 based on the identified frequency components and/or the amplitude. In another example, the second vehicle 105 computer 110 may actuate the sound generation system 140 based on stored attributes, e.g., a 100 decibels sound with 90 Hz frequency, stored in the vehicle 105 computer 110.

Next, in a block 325, the second vehicle 105 computer 110 receives audio data from an audio sensor 130 in the second vehicle 105 and determines whether there is a fault in the sound generation system 140 of the second vehicle 105. Based on various techniques, such as described with reference to the block 235, the second vehicle 105 computer 110 may determine whether there is a fault in the sound generation system 140 of the second vehicle 105. The computer 110 then generates diagnostic data based on the determination whether there is a fault in the sound generation system 140. As discussed below, actions may be caused based on the generated diagnostic data.

Next, in a decision block 330, the second vehicle 105 computer 110 determines whether a fault is detected in the sound generation system 140 based on the diagnostic data. The diagnostic data referred to may be generated by the second vehicle 105 computer 110 at the block 325 or may be received from another computer, e.g., a first vehicle 100 computer 110, at a block 370 (see FIG. 3B). If a fault is detected, the process 300 proceeds to a block 350; otherwise the process 300 proceeds to a decision block 340.

In the decision block 340, the second vehicle 105 computer 110 determines whether a speed of the second vehicle 105 is below a predetermined speed threshold, e.g., 30 km/h. If the second vehicle 105 computer 110 determines that the speed of the second vehicle 105 is below the speed threshold, then the process 300 proceeds to a block 345; otherwise the process 300 ends, or returns to the block 305, although not shown in the process 300.

In the block 345, the second vehicle 105 computer 110 actuates the sound generation system 140 to generate sound. In another example, the second vehicle 105 computer 110 may actuate the sound generation system 140 if the second vehicle 105 moves using an electric motor, i.e., a second vehicle 105 engine 120, if available, is turned off. If the second vehicle 105 engine 120 operates to move the second vehicle 105, then a sound generated by the sound generation system 140 may be unnecessary, because a pedestrian and/or a driver of another vehicle may hear the engine 120 sound. Following the block 345, the process 300 ends, or returns to the block 305, although not shown in the process 300.

In the block 350, the computer 110 causes an action based on the detected fault in the sound generation system 140, e.g., outputting a warning to a second vehicle 105 display screen, logging a trouble code, activating a malfunction indicator light on an instrumentation cluster of the second vehicle 105, actuating an audible warning, etc. Additionally or alternatively, after a fault has been detected in the sound generation system 140, other devices in the vehicle 105 may be used to generate a sound such as an engine sound. For example, the computer 110 can be programmed to generate an engine sound using other devices in the vehicle 105, e.g., a vehicle 105 radio, a mobile device 170, etc. Additionally, the computer 110 can be programmed to open one or more vehicle 105 windows 160 by actuating one or more of the vehicle 105 window openers 160. Thus, the sound generated by a device in the vehicle 105 may be better heard by, e.g., a pedestrian proximate to the vehicle 105. The computer 110 may then actuate a vehicle 105 device, e.g., the vehicle 105 radio, to play, e.g., an engine sound, a music, etc. Additionally or alternatively, the computer 110 may be programmed to open the vehicle 105 window(s) 150 based on precipitation data received from, e.g., vehicle 105 rain sensor, a remote computer, etc. For example, the computer 110 may open the window(s) 150 when it is not rainy, e.g., as determined by the computer 110 according to data from vehicle 105 sensors, e.g., rain sensors, detecting whether windshield wipers are activated, etc. Additionally, the computer 110 may be programmed to generate the sound using the devices such as the vehicle 105 radio when the speed of the second vehicle 105 is less than a predetermined threshold. Following the block 350, the process 300 ends.

Turning to FIG. 3B, in the block 355, which can follow the decision block 310 discussed above with reference to FIG. 3A, the second vehicle 105 computer 110 transmits, e.g., via a V-to-V communication interface, a request for evaluation to another vehicle, e.g., a first vehicle 100. Additionally, the second vehicle 105 computer 110 may determine whether another vehicle is present proximate to the second vehicle 105, e.g., based on GPS location data of other vehicles received via a wireless network, and transmit the request for evaluation to another vehicle nearest to the second vehicle 105. The request may include data indicating a location of the second vehicle 105, e.g., GPS location coordinates, a second vehicle 105 identifier such as VIN, a speed of the second vehicle 105, attribute data, e.g., indicating an amplitude and frequency components of a sound that can be generated by the sound generation system 140 of the second vehicle 105, etc. In one example, the second vehicle 105 broadcasts the request for evaluation, e.g., not targeting a specific first vehicle 100. In another example, the second vehicle 105 computer 110 may transmit the request for evaluation to the first vehicle 100, e.g., based on data indicating a location of the first vehicle 100, e.g., received via V-to-V communications detected by vehicle 105 sensors.

Next, in a decision block 360, the second vehicle 105 computer 110, determines whether control instructions are received from the other vehicle, e.g., the first vehicle 100. Additionally, in one example, the computer 110 further determines whether the received instructions are targeted at the second vehicle 105, e.g., based on a target vehicle VIN included in the received control instructions. If the computer 110 determines that the control instructions are received then the process 300 proceeds to a block 365; otherwise the process 300 returns to the block 355 to, e.g., transmit a request for evaluation to another vehicle.

In the block 365, the second vehicle 105 computer 110 applies the received control instructions including actuating the sound generation system 140 to output a sound. The received control instructions may include a duration of time, frequency components, amplitude, a multi-step pattern of actuation, etc. The control instructions may include other data such as a command to turn off the second vehicle 105 engine 120. Thus, the second vehicle 105 computer 110 may send a command, e.g., to a powertrain controller of the second vehicle 105, to turn off the second vehicle 105 IC engine 120. Additionally, the second vehicle 105 computer 110 may transmit status data via the V-to-V communication interface indicating, e.g., a status of operating the sound generation system 140. For example, the status data may be synchronized, as described above, to actuating of the sound generation system 140, i.e., indicating current operational status of the sound generation system 140, e.g., current amplitude of sound being generated by the sound generation system 140.

Next, in a block 370, the second vehicle 105 computer 110 receives diagnostic data from the first vehicle 100. Thus, advantageously, the second vehicle 105 can receive diagnostic data of the sound generation system 140, even though the second vehicle 105 lacks an audio sensor to verify whether the sound generation system 140 has a fault. Next, the process 300 proceeds to the decision block 330 (see FIG. 3A).

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, JAVA™, C, C++, VISUAL BASIC™, JAVA SCRIPT™PERL™, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, programmed to:
   actuate a window opener of a first vehicle to open a window of the first vehicle;
   send, an instruction from a first vehicle, via a wireless network, to a second vehicle to actuate a sound output of the second vehicle;
   then, receive audio data collected from a sensor in the first vehicle;

upon determining whether the received audio data is received from the sound output of the second vehicle, generate diagnostic data based on the received audio data; and actuate a control output based on the diagnostic data.

2. The computer of claim 1, wherein the computer is further programmed to receive status data from the second vehicle and determine, based on at least in part on the received status data from the second vehicle, whether the received audio data is from the sound output of the second vehicle.

3. The computer of claim 1, wherein the sensor is one of a vehicle-mounted microphone and a microphone in a mobile device.

4. The computer of claim 1, wherein the computer is further programmed to generate diagnostic data by:
calculating a frequency distribution of the received audio data; and
determining, based on the calculated frequency distribution, whether the received audio data includes one or more expected frequency components.

5. The computer of claim 4, wherein the computer is further programmed to receive attribute data of the expected frequency components from a second computer.

6. The computer of claim 4, wherein the computer is further programmed to receive data from an object detection sensor of the first vehicle, detect the second vehicle based on the received data, determine at least one of a size and a type of the second vehicle based on the detected second vehicle, and identify the expected frequency components based on at least one of the size and the type of the second vehicle.

7. The computer of claim 1, wherein the computer is further programmed to generate diagnostic data by determining whether an amplitude of the received audio data exceeds a predetermined amplitude threshold.

8. The computer of claim 7, wherein the computer is further programmed to determine whether the amplitude of the received audio data exceeds the predetermined amplitude threshold based on a second vehicle distance relative to a first vehicle location.

9. The computer of claim 7, wherein the computer is further programmed to receive attribute data from the second vehicle and identify the predetermined amplitude threshold based on the received attribute data.

10. The computer of claim 9, wherein the received attribute data includes an amplitude of an acoustic data generated by a sound generation system of the second vehicle.

11. The computer of claim 1, further programmed to:
receive a message indicating a request for evaluation of a sound generation system of the second vehicle; and
determine whether the first vehicle can provide diagnostics based on a first vehicle speed, a second vehicle speed, a distance of the second vehicle relative to the first vehicle, and whether the first vehicle has an audio sensor.

12. The computer of claim 1, wherein the computer is further programmed to determine that the received audio data is originated by the second vehicle based on status data, received via a wireless network from the second vehicle, indicating a status of sound generation system operation of the second vehicle.

13. The computer of claim 1, wherein the first vehicle is one of a land vehicle and an airborne vehicle.

14. A computer, programmed to:
transmit, from a first vehicle, to a second vehicle, a request for evaluation of a sound generation system of the first vehicle;
actuate the sound generation system to generate a sound output at least in part based on a reply from the second vehicle;
receive diagnostic data, based on the sound output, from the second vehicle, in response to the transmitted request for evaluation, diagnostic data indicating whether a fault was determined in the sound generation system; and
actuate a control output in the first vehicle based on the received diagnostic data, wherein the control output includes at least one of turning on a malfunction indicator light and actuating an audible warning.

15. The computer of claim 14, wherein the computer is further programed to turn off a first vehicle engine before actuating the sound generation system.

16. The computer of claim 14, wherein the computer is further programmed to:
receive audio data from a first vehicle audio sensor when a first vehicle engine is running; and
identify at least one of frequency distribution components and an amplitude threshold of an engine sound based on the received audio data.

17. The computer of claim 14, wherein the computer is further programmed to transmit the request if the first vehicle lacks an audio sensor.

* * * * *